May 4, 1965   R. D. WEBER   3,181,335
EXTRUSION APPARATUS
Filed Nov. 24, 1961

3,181,335
EXTRUSION APPARATUS
Rolf Dietrich Weber, Vasteras, Sweden, assignor to Aktiebolaget Svenska Metallverken, Vasteras, Sweden, a joint-stock company limited of Sweden
Filed Nov. 24, 1961, Ser. No. 154,681
Claims priority, application Sweden, Dec. 16, 1960, 12,193/60
8 Claims. (Cl. 72—273)

The present invention relates to improvements in extrusion apparatus and to methods of extruding material by means of the improved apparatus.

All known processes for the extrusion of material have the serious disadvantage that annular layers or concentric inclusions of oxide are formed in the extrusion process beneath the surface of the material being extruded.

Such extrusion defects or rear-end faults, which may extend over a substantial length of the extruded material, are caused by the uneven flow of the material during the extrusion process and this uneven flow is substantially due to the unsymmetrical force exerted on the material by virtue of the cylindrical shape of the pressure member which is attached to the working end of the extrusion ram and through which pressure is transmitted from the ram to the material.

Also in known extrusion apparatus the cylindrical pressure member has to be a relatively close fit in the extrusion chamber to prevent it from tilting, and as the pressure member is usually formed from a harder material than the chamber it tends to cause considerable wear on the wall of the extrusion chamber.

It is an object of the present invention to provide extrusion apparatus which will eliminate or substantially reduce the above described extrusion defects in the extruded material and which will minimize the wear on the wall of the extrusion chamber.

According to the invention there is provided extrusion apparatus comprising a substantially cylindrical extrusion chamber, a die fixed at one end thereof through which material can be extruded, at the opposite end of the extrusion chamber an extrusion ram the working end of which is movable relative to the extrusion chamber up to and within the extrusion chamber and means for driving the extrusion ram to force the material to be extruded through the die, wherein there is provided at the working end of the extrusion ram a spherical or part-spherical pressure member adapted to transmit the driving force from the extrusion ram to the material to be extruded.

According to a further aspect of the invention there is provided a method of extruding a rod in which a billet of the material to be extruded is forced through an extrusion chamber and thence through a die with the aid of an extrusion ram reciprocable in the chamber, and wherein a spherical or part-spherical pressure member with a clearance fit in the chamber is interposed between the billet and the extrusion ram.

A preferred form of the invention will now be described with reference to the accompanying diagrammatic drawings, in which.

Figure 1:
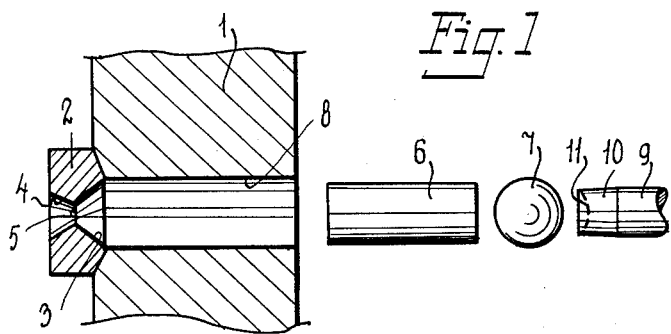
FIGURE 1 is an axial cross-section through an extrusion press showing also a billet of material, a pressure member and a part of an extrusion ram positioned outside the press.

In the figures an extrusion press is indicated generally at 1. The extrusion press 1 is formed with a substantially cylindrical extrusion chamber 8 and an extrusion die 2 which is fixed at one end of the chamber 8. The extrusion die 2 has a venturi die opening 5 comprising an inner frustro-conical wall 3 and an outer frusto-conical wall 4. At the other end of the chamber 8 is an extrusion ram 9 which is movable up to and within the chamber 8 and which has a tapered frustro-conical working end 10. A pressure member 7 is positioned between the working end of the extrusion ram and a billet 6 of the material to be extruded. The pressure member 7 is spherical, and has a diameter providing a clearance fit in the chamber 8. The member 7 seats in a concave spherical bearing surface 11 which is formed in the working end 10 of the extrusion ram.

Figure 2:
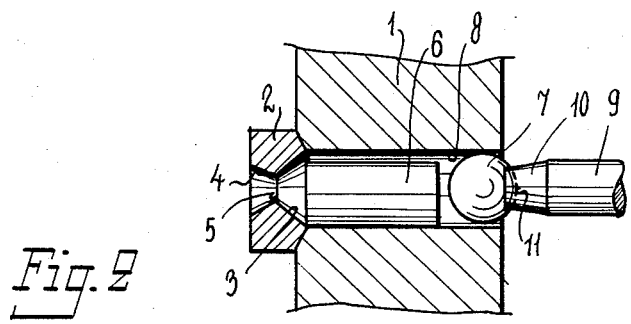
FIGURE 2 is similar to FIGURE 1 except that the billet, pressure member and working end of the extrusion ram are shown in the initial position of the extrusion process.
Figure 3:
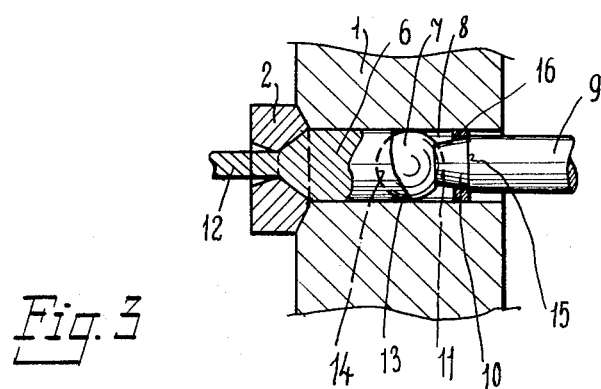
FIGURE 3 is similar to FIGURE 2 except that it shows a further stage in the extrusion process, a rod being partially extruded, and the extrusion ram is modified.

Means is provided, although not shown in the figures for driving the extrusion ram to force the billet 6 into the chamber 8 as shown in FIGURE 2 and through the extrusion die 2 as shown in FIGURE 3.

It will be seen from FIGURE 2 that as the billet 6 enters the chamber 8 and before it is forced into the venturi opening 5 of the die 2 it does not completely fill the cross section of the chamber.

As the extrusion ram 9 and pressure member 7 force the material through the die 2 to form an extruded rod 12 as shown in FIGURE 3, the billet 6 fills the entire cross section of the chamber 8 and the pressure member 7 centers itself behind the billet. The pressure exerted on the billet through the spherical pressure member 7 is concentrated along the axis of the billet with a limited amount of drag or retardation occurring at the periphery. A relatively thin shell of material is left lining the chamber 8 after the extrusion process is completed and this shell can be removed easily before the next billet is inserted. In known extrusion apparatus in which the pressure member is cylindrical in shape the shell of material left in the chamber is frequently broken by the tilting of the pressure member and consequently the chamber has to be brushed out after every process.

The use of a spherical pressure member distributes the forces which are transmitted through the pressure member to the billet so that the maximum force is applied along the axis of the billet and the minimum at the periphery. This distribution of pressure on the billet creates a new flow pattern in the material and eliminates the formation of oxide layers beneath the surface of the extruded rod and concentric inclusions of oxide derived from the periphery of the billet, so that the extruded rod 12 is uniformly solid in cross section along its entire length and extrusion defects or rear end faults are substantially eliminated.

The pressure member 7 is formed preferably from a material which is softer than the material forming the wall of the extrusion chamber and although shown in the figures as being spherical it may if desired be shaped so that only that part bearing against the billet is spherical.

In FIGURE 3 the extrusion ram is modified so as to have a shoulder 15 at its working end 10 against which rests an annular external sealing ring 16. The sealing ring 16 acts partially as a guide for the extrusion ram and also seals the chamber 8.

The above described process and apparatus is suitable for use with either a cold or a pre-heated billet of material.

Having now described the invention, what I claim as new and desire to secure by Letters Patent is:

1. In an extrusion press wherein material is fed to a cylindrical chamber and forced through a die bounding said chamber by a ram, a ball shaped member between the ram and the material of a diameter less than that of the diameter of the chamber for limiting the transfer of force from the ram to the material substantially centrally of the latter, said ram being provided with a spherical bearing surface in which is partially accommodated said ball shaped member.

2. In an extrusion press as claimed in claim 1 wherein said ram includes a cylindrical portion of reduced diameter relative to said chamber, said ram including a frusto-conical end portion narrowing towards said ball shaped member for contacting the same, said bearing surface being provided in said frusto-conical end portion.

3. In an extrusion press having a cylindrical chamber and a die associated therewith and through which chamber and die may be forced material to extrude the latter, a ram movable in said chamber with clearance to force the material therein through the die to extrude said material, and an independent ball member having a diameter less than that of said ram freely supported in the chamber between the ram and the material for transferring force from the ram to the material.

4. In an extrusion press as claimed in claim 3, wherein said ram includes a cylindrical portion of reduced diameter relative to said chamber and ball member, said ram including a frusto-concial end portion narrowing towards said ball shaped member for contacting the same.

5. In an extrusion press as claimed in claim 4 wherein said ram is provided with a concave bearing surface of spherical shape for accommodating said ball shaped member, said apparatus further comprising a sealing ring on said ram for sealing the chamber as the ram is inserted therein.

6. In an extrusion press as claimed in claim 3, wherein said press has a wall bounding said chamber, said ball shaped member being constituted of material which is softer than the material of the wall of the chamber.

7. An extrusion press having a cylindrical extrusion chamber and a die in association with the chamber and through which die may be extruded material forced from said chamber, said press comprising: an extrusion ram movable in said chamber to force material therein through the die, a spherical pressure member freely supported in the chamber between the material and the ram for transferring force from the ram to the material to be extruded, said ram including a cylindrical portion which fits with clearance in said chamber, said spherical pressure member having a diameter less than that of the cylindrical chamber to be freely movable therein, said ram including an end portion adapted for contacting said spherical member to urge the latter into contact with the material, said end portion of the ram being provided with a concave bearing surface adapted for accommodating said spherical pressure member.

8. In an extrusion press having a chamber and a die associated therewith and through which chamber and die may be forced material to extrude the latter, a ram movable with clearance in said chamber generally axially therein, and ball means freely supported with clearance in said chamber between said ram and said material to transfer force from the ram to the material while remaining free in said chamber irrespective of inclination of the ram within the chamber.

References Cited by the Examiner
UNITED STATES PATENTS

| | | | |
|---|---|---|---|
| 888,299 | 5/08 | Benjamin | 207—10.21 |
| 1,360,558 | 11/20 | Mattsson | 29—90 |
| 2,021,828 | 11/35 | Berry | 207—9 |
| 2,337,804 | 12/43 | Dempsey | 207—10.21 |
| 2,974,790 | 3/61 | Murphy et al. | 207—10.21 |

FOREIGN PATENTS 1,043,869   6/53   France.

OTHER REFERENCES

Pearson and Parking: The Extrusion of Metals, 2nd ed., John Wiley & Sons, Inc., N.Y., 1960.

MICHAEL V. BRINDISI, *Primary Examiner.*

WILLIAM W. DYER, JR., CHARLES W. LANHAM, *Examiners.*